(12) United States Patent
Roaldson et al.

(10) Patent No.: US 10,261,678 B2
(45) Date of Patent: *Apr. 16, 2019

(54) SYSTEMS AND METHODS FOR DYNAMICALLY CONTROLLING CONTENT DISPLAYED ON A CONDITION MONITORING SYSTEM

(71) Applicant: General Electric Company, Schenectady, NY (US)

(72) Inventors: Ryan Gregory Roaldson, Minden, NV (US); Jacqueline Marie Tappan, Minden, NV (US)

(73) Assignee: General Electric Company, Schenectady, NY (US)

( * ) Notice: Subject to any disclaimer, the term of this patent is extended or adjusted under 35 U.S.C. 154(b) by 269 days.

This patent is subject to a terminal disclaimer.

(21) Appl. No.: 15/206,701

(22) Filed: Jul. 11, 2016

(65) Prior Publication Data

US 2016/0320958 A1 Nov. 3, 2016

Related U.S. Application Data

(63) Continuation of application No. 13/946,568, filed on Jul. 19, 2013, now Pat. No. 9,389,761.

(51) Int. Cl.
*G06F 3/048* (2013.01)
*G06F 3/0484* (2013.01)
(Continued)

(52) U.S. Cl.
CPC ..... *G06F 3/04847* (2013.01); *G05B 23/0267* (2013.01); *G06F 3/0482* (2013.01);
(Continued)

(58) Field of Classification Search
CPC .. G06F 3/04847; G06F 3/0482; G06F 3/0484; G06F 9/451; G05B 23/0267;
(Continued)

(56) References Cited

U.S. PATENT DOCUMENTS 6,889,096 B2 5/2005 Spriggs et al.
7,206,646 B2 4/2007 Nixon et al.
(Continued)

FOREIGN PATENT DOCUMENTS

EP 2169497 A1 3/2010
EP 2246759 A2 11/2010

OTHER PUBLICATIONS

International Search Report and Written Opinion issued in connection with corresponding PCT Application No. PCT/US2014/037943 dated Aug. 6, 2014.

*Primary Examiner* — Tadesse Hailu
(74) *Attorney, Agent, or Firm* — Mintz Levin Cohn Ferris Glovsky and Popeo, P.C.

(57) ABSTRACT

A system for dynamically controlling content displayed on a condition monitoring system may include a processor that may receive one or more datasets associated with one or more components in an industrial environment. The system may also include a graphical user interface (GUI) that may display visualizations representing the components in a first portion of the GUI. The GUI may then receive a first selection of the visualizations and display data processing outputs associated with the first selection in a second portion of the GUI. There, the data processing outputs may be determined based on a first dataset that corresponds to a first component associated with the first selection. The GUI may then receive a second selection of the visualizations and may dynamically update the data processing outputs based on a second dataset that corresponds to a second component.

20 Claims, 7 Drawing Sheets

(51) Int. Cl.
  *G05B 23/02* (2006.01)
  *G06F 9/44* (2018.01)
  *G06F 9/451* (2018.01)
  *G06F 3/0482* (2013.01)
(52) U.S. Cl.
  CPC ............ *G06F 3/0484* (2013.01); *G06F 9/451* (2018.02); *G05B 2219/23067* (2013.01); *G05B 2219/23136* (2013.01); *G05B 2219/23171* (2013.01); *G05B 2219/23178* (2013.01)
(58) Field of Classification Search
  CPC ........... G05B 2219/23067; G05B 2219/23136; G05B 2219/23171; G05B 2219/23178
  See application file for complete search history.

(56) References Cited

U.S. PATENT DOCUMENTS

| | | | |
|---|---|---|---|
| 9,954,976 B2* | 4/2018 | Engel | H04L 67/36 |
| 2002/0077711 A1 | 6/2002 | Nixon et al. | |
| 2005/0007249 A1 | 1/2005 | Eryurek et al. | |
| 2005/0240289 A1 | 10/2005 | Hoyte et al. | |
| 2007/0260982 A1 | 11/2007 | Wayland et al. | |
| 2007/0266321 A1* | 11/2007 | Bicker | G06F 3/0481 715/713 |
| 2011/0029102 A1 | 2/2011 | Campney et al. | |
| 2014/0297229 A1* | 10/2014 | Izumo | G01G 23/00 702/189 |

* cited by examiner

SYSTEMS AND METHODS FOR DYNAMICALLY CONTROLLING CONTENT DISPLAYED ON A CONDITION MONITORING SYSTEM

CROSS REFERENCE TO RELATED APPLICATIONS

This application is a continuation of U.S. patent application Ser. No. 13/946,568, entitled "Systems And Methods For Dynamically Controlling Content Displayed on a Condition Monitoring System," filed Jul. 19, 2013, which is incorporated by reference in its entirety.

BACKGROUND

The subject matter disclosed herein relates to systems and methods for controlling content presented on a graphical user interface (GUI) of a condition monitoring system. More specifically, the subject matter disclosed herein relates to dynamically controlling the content displayed on the GUI based on real-time input received by the GUI.

Industrial monitoring systems, such as asset condition monitoring systems, generally provide monitoring capabilities for various types of mechanical devices and systems. For example, an industrial monitor may monitor one or more operational parameters of a gas turbine system. By specific example, the industrial monitoring system may include a number of sensors (e.g., temperature sensors, pressure sensors, flow sensors, and so forth) disposed throughout the gas turbine system. Such sensors may allow the industrial monitoring system to determine parameters of the mechanical system based, at least in part, on input received from these sensors. Additionally, certain industrial monitoring systems may include one or more graphical user interfaces (GUIs) that may be used to present (e.g., to an operator) the determined parameters of the mechanical system being monitored.

In this manner, condition monitoring systems may provide users with valuable information regarding the health or condition of various machines in an industrial environment. For instance, condition monitoring systems may receive inputs from a broad range of sources in an industrial plant including permanent and portable condition monitoring hardware/software, process control and automation hardware/software, process historians, maintenance management and reliability software, spreadsheets, operator logs, and the like. Using the data received from these sources, users of the condition monitoring systems may analyze the data using various tools provided by the condition monitoring systems. However, due to the decreasing availability of technically inclined personnel available in the general workforce of the industrial industry, it is now recognized that improved systems and methods for intuitively operating condition monitoring systems via a graphical user interface are desired.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system for dynamically controlling content displayed on a condition monitoring system may include a processor that may receive one or more datasets associated with one or more components in an industrial environment. The system may also include a graphical user interface (GUI) that may display visualizations representing the components in a first portion of the GUI. The GUI may then receive a first selection of the visualizations and display data processing outputs associated with the first selection in a second portion of the GUI. There, the data processing outputs may be determined based on a first dataset that corresponds to a first component associated with the first selection. The GUI may then receive a second selection of the visualizations and may dynamically update the data processing outputs based on a second dataset that corresponds to a second component.

In a second embodiment, a non-transitory computer-readable medium may include machine-readable instructions executable by the computer-readable medium to cause the computer-readable medium to display one or more visualizations representing the one or more components in a first portion of a graphical user interface (GUI). The computer-readable medium may receive a first selection of the one or more visualizations and display one or more event lists associated with the first selection in a second portion of the GUI. Here, the event lists may include information related to one or more events associated with a first component that corresponds to the first selection. The computer-readable medium may then receive a second selection of the one or more visualizations, such that the second selection corresponds to a second component. The computer-readable medium may then dynamically update the event lists based the second selection.

In a third embodiment, a method may include displaying, via a graphical user interface (GUI), one or more visualizations representing the one or more components in a first portion of the GUI. The method may then include receiving a first selection of the one or more visualizations, such that the first selection corresponds to a first component of the components. The method may then display one or more data processing outputs associated with the first selection in a second portion of the GUI, such that the data processing outputs are determined based on a first dataset that corresponds to the first component. The method may then include receiving a second selection of the one or more visualizations, such that the second selection corresponds to a second component of the components. The method may then dynamically update the data processing outputs based on a second dataset that corresponds to the second component

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In an industrial environment, a number of machines may be operating together to perform various tasks related to mass producing a product, processing certain chemicals, and the like. Generally, each of the machines in the industrial environment may include a number of sensors attached thereto to monitor various conditions within a respective machine. For example, in a motor, one sensor may measure a rotational speed of the motor's shaft, while another sensor may measure an internal temperature of the motor. In any case, the data received by these sensors may be provided as inputs into a condition monitoring system, such that the received data may be presented to users in a coherent and comprehensible manner. The received data may then be processed or analyzed by the condition monitoring system using various types of data processing or analysis tools or the like. As such, if the condition monitoring system processes the received data, the condition monitoring system may present the received data in a manner that may be interpreted or analyzed by a user. Additionally or alternatively, the received data may be processed or analyzed using a separate analysis product, which may communicate its results to the condition monitoring system.

In certain embodiments, the condition monitoring system may include a graphical user interface (GUI) that may present visualizations that represent the machines being monitored by the condition monitoring system. In addition to the visualizations, the condition monitoring system may present the data received by the sensors associated with the monitored machines via the GUI. The condition monitoring system may also perform certain types of data processing or analysis functions such as plotting trend graphs, plotting statistical spectrum graphs, plotting historical charts, and the like, which may then be displayed via the GUI. In one embodiment, the visualizations representing the monitored machines depicted on the GUI may be dynamically linked to data processing or analysis tools provided by the condition monitoring system. As such, the condition monitoring system or the separate processing or analysis product may dynamically analyze data associated with a monitored machine based on a selection of a machine visualization from the GUI. That is, once a user has selected a visualization of a machine via the GUI, the condition monitoring system may automatically update any processing or analysis tools currently being utilized by the GUI to analyze the data associated with the selected machine. In this manner, the GUI provides an intuitive and simple way for users to monitor machines in the industrial environment and analyze data associated with those machines using the condition monitoring system. Additional details with regard to how the GUI may dynamically control various data processing or analysis tools of the condition monitoring system will be described below with reference to FIGS. 1-8.

Figure 1:
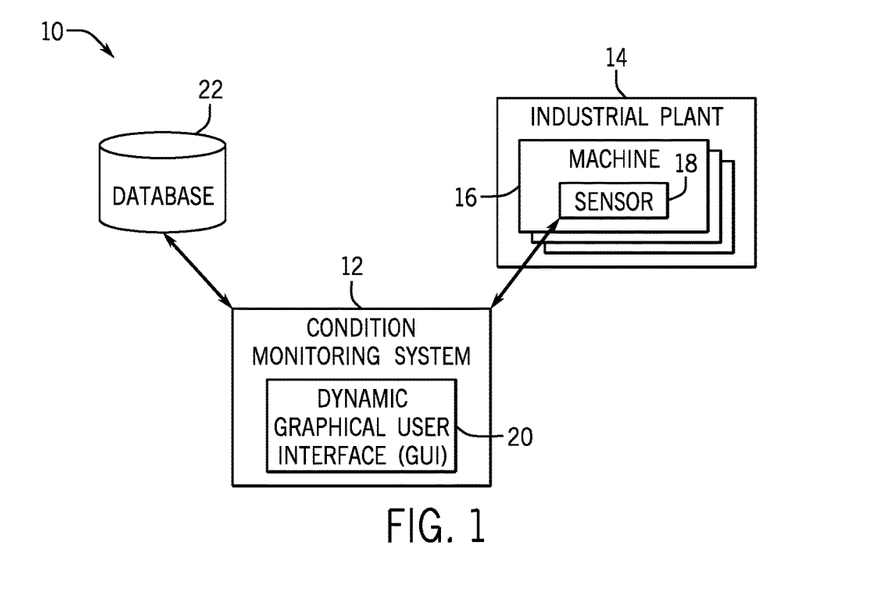
FIG. 1 illustrates a block diagram of an industrial monitoring system, in accordance with embodiments presented herein.

By way of introduction, FIG. 1 illustrates a block diagram of an industrial monitoring system 10 in which various types of machines used for industrial processes may be monitored. The industrial monitoring system 10 may include a condition monitoring system 12, which may receive data from various components (e.g., machines) that may be part of an industrial environment. For example, the condition monitoring system may monitor components used in an industrial plant 14. The industrial plant 14 may include any type of industrial environment where different components or machines may be used to complete one or more industrial processes. As such, the industrial plant 14 may correspond to an oil refinery, a manufacturing facility, a turbomachine system, a power generation system, a gasification system, a chemical production system, a gas turbine system, a stream turbine system, a combined cycle system, a power plant, or the like.

The components in the industrial plant 14 may include one or more machines 16 or components such as a motor, a gas turbine, a heat exchanger, centrifugal pumps, centrifugal compressors, fans, reciprocating compressors, generators, steam turbines, wind turbines, piping, axial compressors, screw compressors, gears, turbo-expanders, blowers, agitators, mixers, pulp refiners, ball mills, crushers, pulverizers, extruders, pelletizers, cooling towers, and the like. Each machine may include one or more sensors 18 that may monitor various aspects of a respective machine 16. The sensors 18 may include temperature sensors, current sensors, voltage sensors, pressure sensors, displacement sensors, velocity sensors, acceleration sensors, flow sensors, clearance sensors, flame sensors, gas composition sensors, vibration sensors, and any other type of sensor that may provide information with respect to the operation of the respective machine 16.

Generally, the data acquired by the sensors 18 may be received by the condition monitoring system 12 via a direct link (i.e., hardwired), a network link, or a portable memory device (e.g., Universal Serial Bus memory drive). In one embodiment, the condition monitoring system 12 may include a dynamic graphical user interface (GUI) 20 that may generate visualizations that represent the machines 16 and the sensors 18 being monitored by the condition monitoring system 12. As such, users of the condition monitoring system 12 may monitor the health or status of machines 16 in the industrial plant 14 via the dynamic GUI 20. Further, the condition monitoring system 12 may be used to measure one or more mechanical devices of larger mechanical systems (e.g., steam turbine systems, hydraulic turbine systems, wind turbine systems, reactors, gasifiers, gas treatment systems, industrial automation systems, or other suitable mechanical systems).

The dynamic GUI 20 may enable the user to perform various types of data processing or analysis using tools provided by the condition monitoring system 12 or by separate data processing or analysis products. For instance, the user may generate a graph plotting a statistical trend of the data received from a particular sensor 18 over time. In one embodiment, after the statistical trend graph has been generated, the user may dynamically control the data being analyzed by the tool by selecting a different sensor 18 visualization displayed in the dynamic GUI 20. Additional details with regard to how the user may dynamically control the data being analyzed using the dynamic GUI 20 will be described below with reference to FIGS. 3-8.

In addition to data acquired by the sensors 18, the condition monitoring system 12 may receive data from a database 22 which may be stored within the condition monitoring system 12, in a server, in a cloud-computing device, or the like. The database 22 may include historical data related to the data acquired by the sensors 18, calculated data associated with a machine 16 or sensor 18, results from previous data processing or analysis functions performed on data associated with a machine 16 or sensor 18, or other contextual data related to the industrial plant 14. For example, the database 22 may include data related to the historical operating conditions (e.g., when operating at full capacity) of the industrial plant 14 such as a plant historian or the like.

Although FIG. 1 has been described with respect to the industrial plant 14, it should be noted that the systems and techniques described herein may be applied to other systems outside of the industrial environment. As such, the systems and techniques described herein should not be limited to industrial environments and the like.

Figure 2:
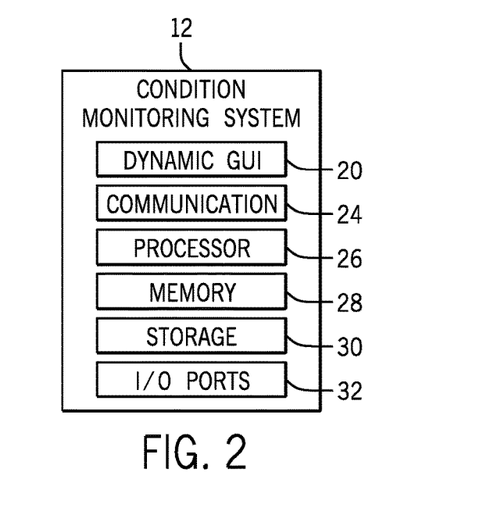
FIG. 2 illustrates a block diagram of a condition monitoring system that may be employed in the industrial monitoring system of FIG. 1, in accordance with embodiments presented herein.

In addition to the dynamic GUI 20, the condition monitoring system 12 may include various other components to display data, processing or analysis of data, and the like via the dynamic GUI 20. FIG. 2 illustrates a block diagram of some example components that may be part of the condition monitoring system 12. As shown in the figure, the condition monitoring system 12 may include a dynamic GUI 20, a communication component 24, a processor 26, a memory 28, a storage 30, input/output (I/O) ports 32, and the like. The communication component 24 may be a wireless or wired communication component that may facilitate communication between the condition monitoring system 12, the machines 16, the sensors 18, the database 22, other control or monitoring systems, and the like. The processor 26 may be any type of computer processor or microprocessor capable of executing computer-executable code. The memory 28 and the storage 30 may be any suitable articles of manufacture that can serve as media to store processor-executable code, data, or the like. These articles of manufacture may represent non-transitory computer-readable media (i.e., any suitable form of memory or storage) that may store the processor-executable code used by the processor 26 to, among other things, analyze data and dynamically link analyzed data with visualizations displayed and selected via the dynamic GUI 20. The non-transitory computer-readable media merely indicates that the media is tangible and not a signal.

The dynamic GUI 20 may include any type of display device including a touch screen display device that may receive user inputs via the display device itself. In certain embodiments, the dynamic GUI 20 may interact with the communication component 24, the processor 26, the memory 28, the storage 30, and the input/output (I/O) ports 32 to dynamically update or control visualizations displayed on the dynamic GUI 20. The dynamic GUI 20 may be disposed on any type of computing device including an industrial monitor, a workstation, a portable monitoring device, a smart phone device, or another suitable device.

Figure 3:
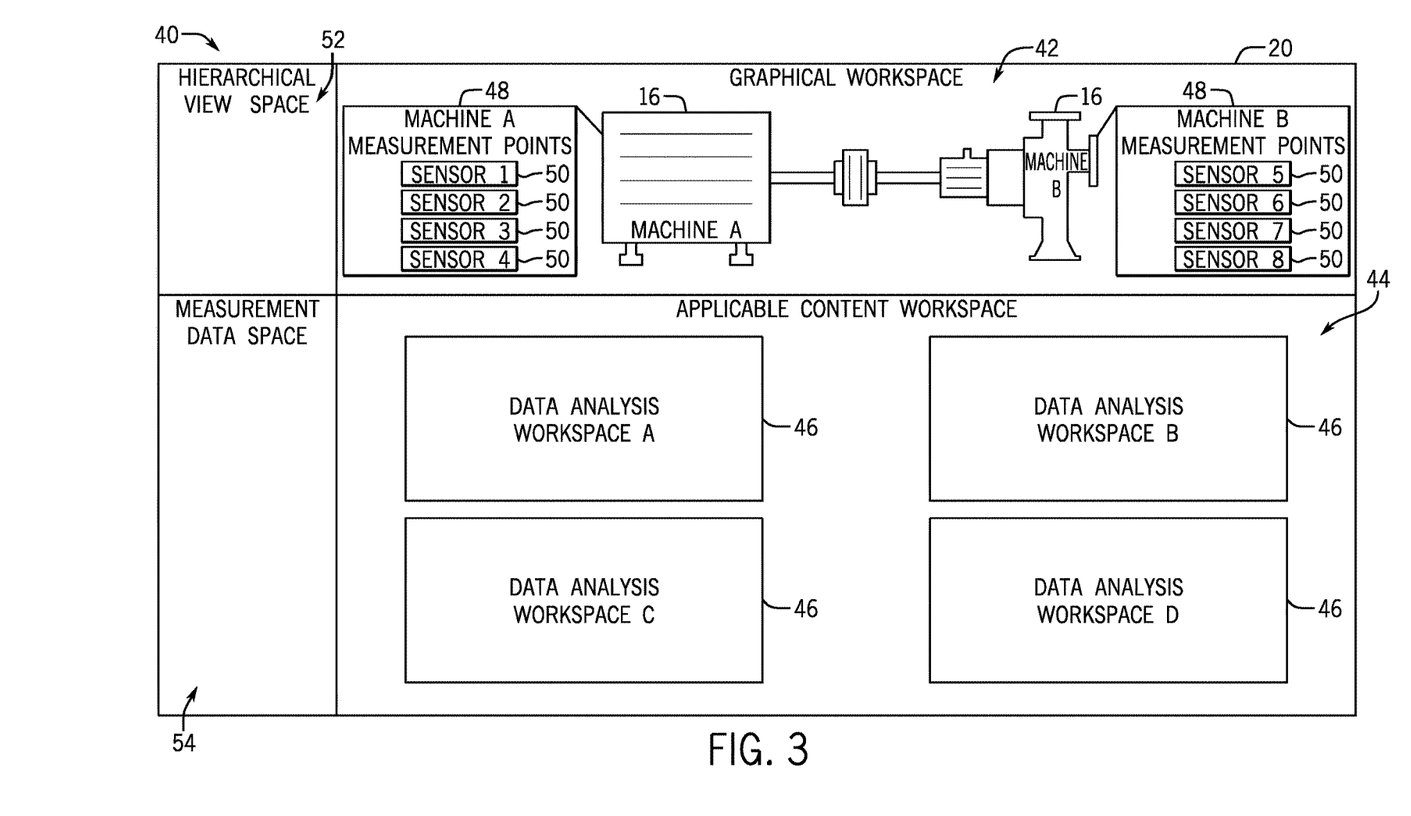
FIG. 3 illustrates a schematic view of graphics displayed on a graphical user interface for the condition monitoring system of FIG. 2, in accordance with embodiments presented herein.

Keeping the foregoing in mind, FIG. 3 illustrates an example view 40 of graphics that may be displayed by the processor 26 via the dynamic GUI 20. Referring to FIG. 3, the dynamic GUI 20 may include a graphical workspace 42 and an applicable content workspace 44. The graphical workspace 42 may include visualizations that represent the machines 16 or a subset of the machines 16 being monitored by the condition monitoring system 12. The machines 16 may be depicted in the graphical workspace 42 as a machine train diagram. The machine train diagram may illustrate how a number of machines 16 may be coupled to each other. The visualizations representing the machines 16 may be selectable components that may be interacted with by a user of the condition monitoring system 12 via the dynamic GUI 20. In one embodiment, a user of the dynamic GUI 20 may select a visualization depicted in the graphical workspace 42, and the dynamic GUI 20 may then dynamically update various processing or analysis tools currently being displayed in the applicable content workspace 44 based on data that corresponds to the machine 16 associated with the selected visualization.

The applicable content workspace 44 may include a number of data analysis workspaces 46. Each data analysis workspace 46 may include results or outputs of various data processing or analysis tools provided by the condition monitoring system 12. The data processing or analysis tools may generate plots that illustrate various trends in the acquired data, spectrum information related to the acquired data, the historical values of the acquired data, the changes in the data over time, and the like. Some additional data processing or analysis outputs may include a waveform plot, a spectrum plot, an orbit plot, a bode plot, compressor performance curves, pump performance curves, histograms, bar graphs, shaft centerline plots, circular plots, waterfall plots, and the like. As such, after selecting a visualization in the graphical workspace 42, the user of the dynamic GUI 20 may send a request to the condition monitoring system 12 to perform some type of data processing or analysis function on the data associated with the machine 16 or sensor 18 that corresponds to the selected visualization. The dynamic GUI 20 may then display the results or outputs of the data processing or analysis in the data analysis workspace 46.

In addition to providing results of data processing or analysis, the applicable content workspace may also provide additional information related to alarm events, statuses, reference materials, and the like regarding a machine 16 or sensor 18 associated with a selected visualization in the graphical workspace 42. The additional information may include various reports, original equipment manufacturer datasheets, work history, and the like.

Referring back to the graphical workspace 42, the graphical workspace 42 may also include a data field 48 that may display data entries 50 associated with a respective machine 16. The data entries 50 may include real-time measurement data received from various sensors 18 disposed on a respective machine 16, data calculated by the processor 26, or the like. The data entries 50 may also include an alarm status or event status indication. For example, each data entry 50 may be shaded with a particular color or associated with a particular color to indicate to the user a specific alarm status. In one embodiment, each data entry 50 may be individually selectable like the visualizations of the machines 16, such that additional information regarding the selected data entry 50 may be presented in the applicable content workspace upon selection.

When a particular data entry 50 has been selected in the graphical workspace 42, the dynamic GUI 20 may dynamically update a hierarchical view space 52 to indicate that the respective data entry 50 has been selected. The hierarchical view space 52 may display a hierarchical structure of the machine train diagram depicted in the graphical workspace 42. That is, the hierarchical structure may list the components depicted in the graphical workspace 42 based on its hierarchical relationship to other components in the graphical workspace 42. For example, Machine A and Machine B may be listed underneath an enterprise that represents the entire machine train diagram depicted in the graphical workspace 42. Under each machine, the data entries 50 for each respective machine may be listed as one hierarchical step removed from the respective machine.

Keeping this in mind, when a particular data entry 50 has been selected in the graphical workspace 42, the dynamic GUI 20 may dynamically highlight the corresponding component listed in the hierarchical view space 52. In this manner, the dynamic GUI 20 may dynamically update different parts of the dynamic GUI 20 after a user makes a single selection elsewhere in the dynamic GUI 20. In the same fashion, when a particular data entry 50 has been selected in the hierarchical view space 52, the dynamic GUI 20 may dynamically highlight or select the corresponding component listed in the graphical workspace 42.

The dynamic GUI 20 may also include a measurement data space 54. The measurement data space 54 may include all measurements that may have been collected for a component selected in the hierarchical view space 52 or the graphical workspace 42. The types of collected measurements may include diagnostic waveforms/spectrums, vectors, scalar variables, and the like. Each type of collected measurement may also be a selectable component dynamically linked with a component displayed in the hierarchical view space 52, the graphical workspace 42, and the applicable content workspace.

In certain embodiments, the components in the graphical workspace 42, the applicable content workspace, the hierarchical view space 52, and the measurement data space 54 may be linked together using software pointers. That is, each selectable component may include one or more pointers that may direct the dynamic GUI 20 to data associated with the selected component, such that the graphical workspace 42, the applicable content workspace, the hierarchical view space 52, and the measurement data space 54 may be updated based on the data associated with the selected component. For example, when a component is selected within the graphical workspace 42, the data presented in the applicable content workspace, the hierarchical view space 52, and the measurement data space 54 may be updated to match the data associated with the selected component. In this manner, each portion of the dynamic GUI 20 may be dynamically updated based on a selection of a component via the dynamic GUI 20. Examples of dynamically updating portions the dynamic GUI 20 will be provided in greater detail below with reference to FIGS. 5-7.

Figure 4:
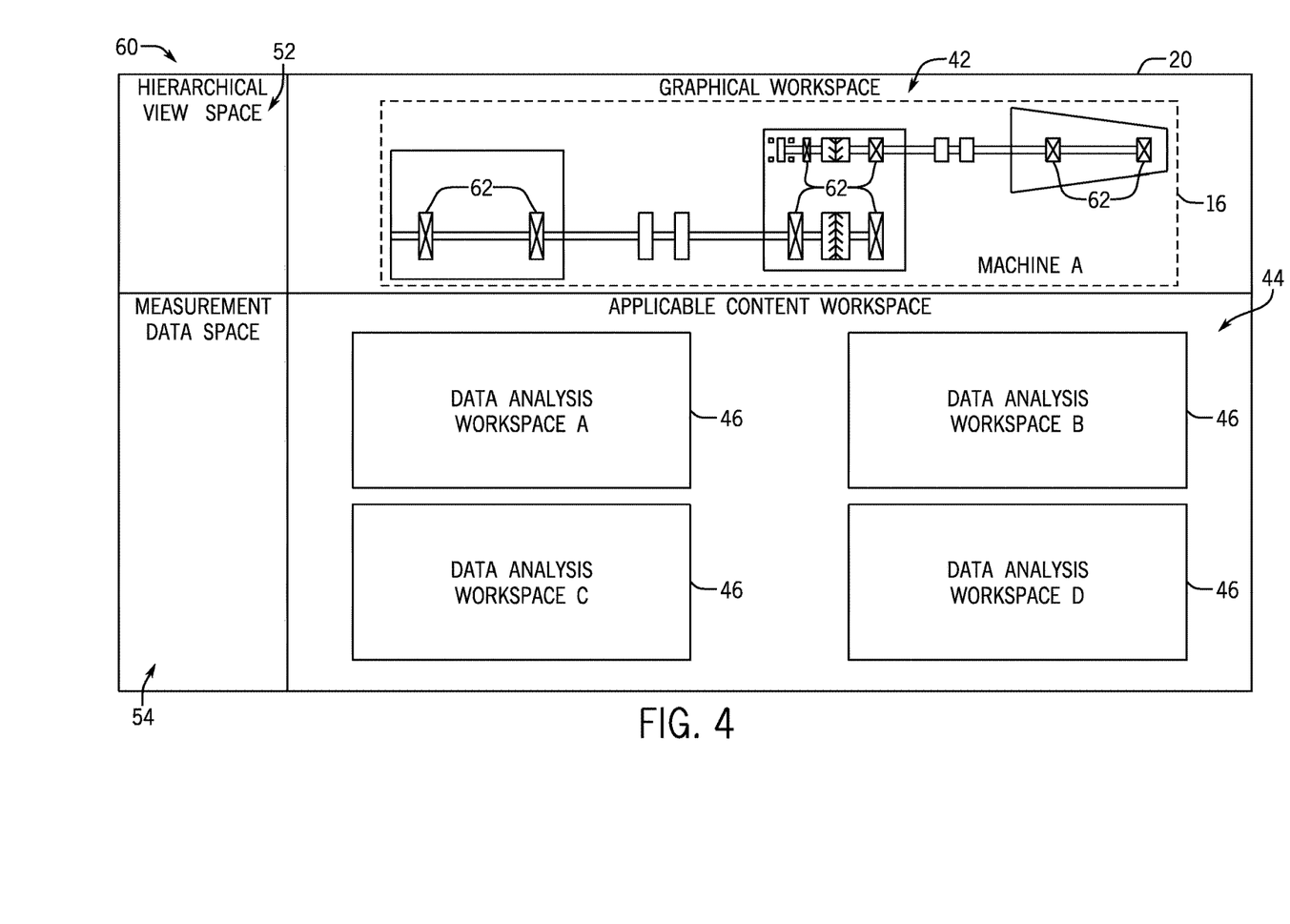
FIG. 4 illustrates a schematic view of updated graphics displayed on the graphical user interface of FIG. 3, in accordance with embodiments presented herein.

Referring back to the graphical workspace 42, in one embodiment, the visualization representing the machine 16 may be selected such that a more detailed view of the selected machine 16 may be displayed. For instance, FIG. 4 illustrates a detailed view 60 of Machine A after the visualization that represents Machine A has been selected. The detailed view 60 may include internal components 62 associated with the selected machine 16 including sensors, bearings, seals, gears, and the like. Like the visualizations displayed in the graphical workspace 42 described above, the visualization of the internal components 62 may be interacted with by the user such that the data presented in the applicable content workspace, the hierarchical view space 52, and the measurement data space 54 may be dynamically updated based on the interaction. In other words, after the dynamic GUI 20 receives a selection of a respective internal component 62 in the graphical workspace 42, the dynamic GUI 20 may dynamically update the applicable content workspace, the hierarchical view space 52, and the measurement data space 54 to reflect data associated with the respective internal component 62.

In certain embodiments, each selectable internal component 62 may be linked or associated with data regarding the respective internal component 62. Data related to a bearing may include a displacement value of a shaft with respect to the bearing, a temperature of the bearing, an axial position of the bearing, an amount in which the bearing is axially moving, vibration information regarding the bearing, oil quality associated with the bearing, and the like. In any case, like the selectable components in the graphical workspace 42 depicted in the view 40 of FIG. 3, any data analysis workspace 46 displayed in the applicable content workspace prior to the selection of the internal component 62 may be dynamically updated based on the newly selected internal component 62. That is, the data processing or analysis performed in each data analysis workspace 46 may be updated immediately after the internal component 62 using pointers as described above.

In one embodiment, after the internal component 62 has been selected, a corresponding data field 48 may be displayed in the graphical workspace 42 of the dynamic GUI 20. As such, the user may receive visual feedback that indicates that the selection has been received. The data field 48 may include data entries 50 as described above. As such, a current status, an alarm status, and the like for the selected internal component 62 may be indicated in the data field 48 or the corresponding data entries 50 using various colors associated with various situations. For example, when a respective data entry 50 is associated with an alarm event or an alarm condition, the respective data entry 50 may be shaded red.

Figure 5:
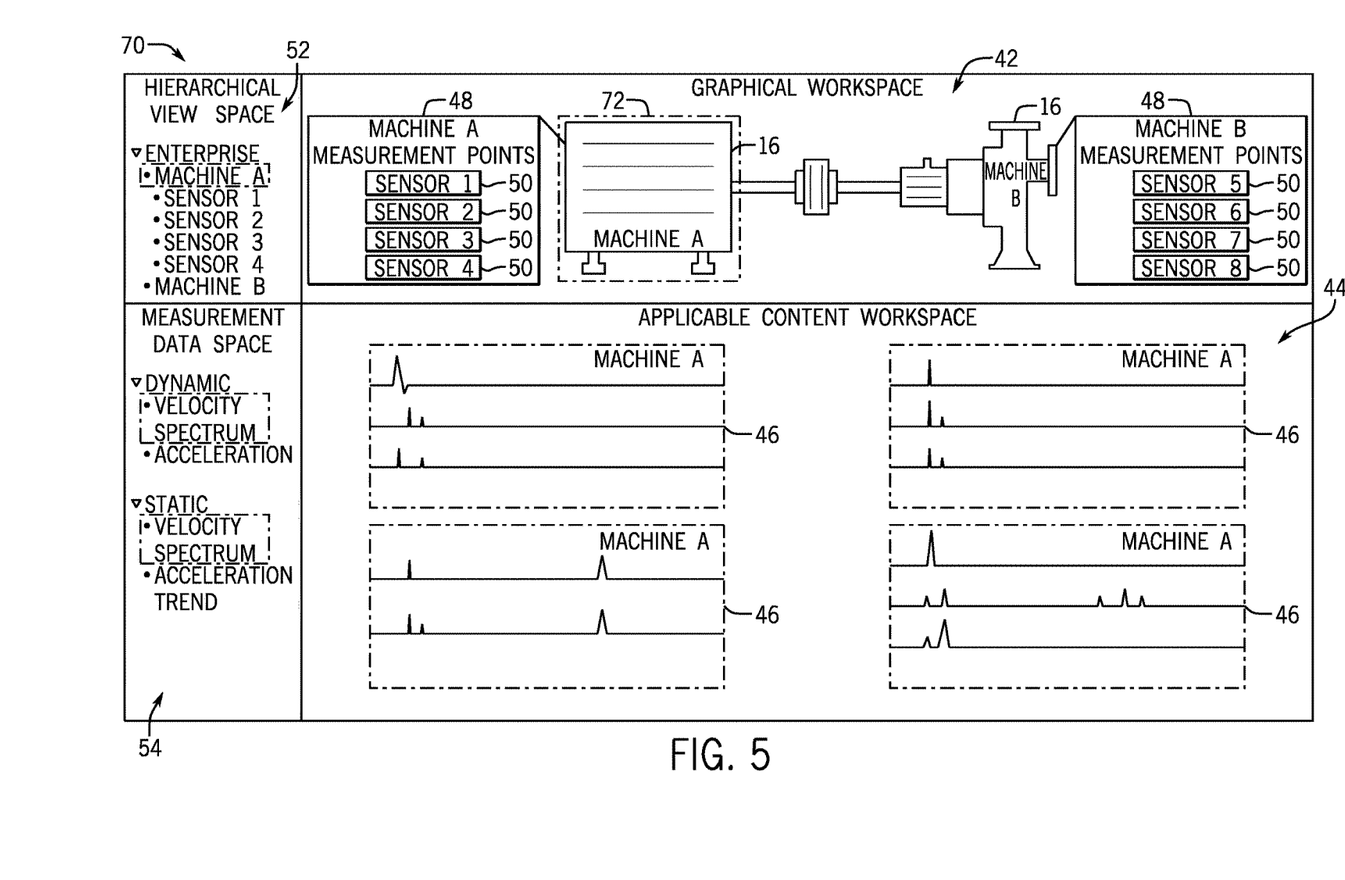
FIG. 5 illustrates a schematic view of the graphics displayed on the graphical user interface having dynamically linked components, in accordance with embodiments presented herein.
Figure 6:
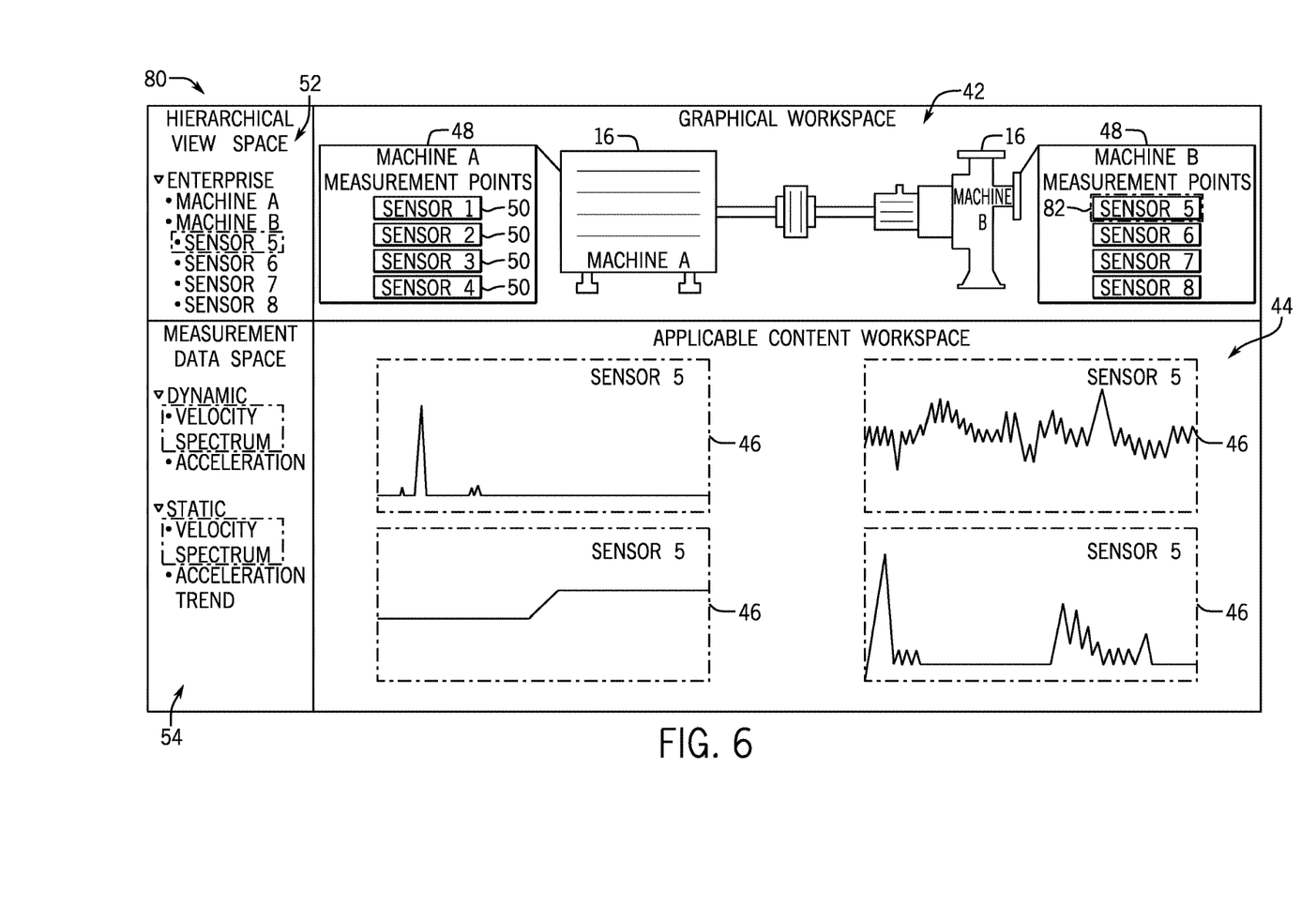
FIG. 6 illustrates a schematic view of the graphics displayed on the graphical user interface, such that the dynamically linked components of FIG. 5 are updated based on a selection in the graphical user interface of FIG. 3, in accordance with embodiments presented herein.

FIGS. 5 and 6 depict example views 70 and 80 of the dynamic GUI 20 illustrating how the dynamic GUI 20 may dynamically update visualizations presented in the applicable content workspace based on a user selecting a component in the graphical workspace 42. Referring first to FIG. 5, the dynamic GUI 20 may receive an input that corresponds to a selection 72. As shown in the figure, the selection 72 corresponds to a visualization representing a respective machine 16 (Machine A) depicted in the graphical workspace 42.

After the dynamic GUI 20 receives the selection 72, the dynamic GUI 20 may update the applicable content workspace, the hierarchical view space 52, and the measurement data space 54 based on the selection 72. For example, after the dynamic GUI 20 receives the selection 72, the dynamic GUI 20 may highlight a component in a hierarchical list provided in the hierarchical view space 52 that corresponds to the selection 72.

In one embodiment, after the selection 72 has been received by the dynamic GUI 20, the dynamic GUI 20 may identify a pointer associated with the Machine A and may update the applicable content workspace based on the data that corresponds to the identified pointer. As such, the data analysis workspaces 46 may then represent all of the data that corresponds with the pointer of Machine A. For instance, the pointer associated with Machine A may include various data points that may be associated with Machine A. Here, the dynamic GUI 20 may generate plots in the data analysis workspaces 46 based on all of the data points that may be associated with Machine A. In one embodiment, each respective data analysis workspace 46 may select relevant data points for its respective data processing or analysis functions and may disregard other data points that may not be involved for its respective data processing or analysis.

In a conventional condition monitoring system, the conventional condition monitoring system may produce a plot upon receiving a request from a user; however, the plot becomes a static window and cannot be updated based on subsequent inputs in the graphical user interface of the conventional condition monitoring system. In contrast, the dynamic GUI 20 of the present disclosure may update the data workspaces 46, among other parts of the dynamic GUI 20, based on inputs received in the graphical workspace 42 since the data workspaces 46 and the components visualized in the graphical workspace 42 may be dynamically linked via pointers and the like.

In addition to being dynamically linked to components in the graphical workspace 42, the data workspaces 46 may also be linked to the components listed in the measurement data space 54. That is, the measurement data space 54 may indicate the type of data processing or analysis being performed in the data workspaces 46. In one embodiment, the applicable content workspace may be dynamically linked to the measurement data space 54, such that a change in the selected component of the measurement data space 54 may cause a change in the type of data processing or analysis being performed in the data workspaces 46. For instance, if the dynamic GUI 20 receives a selection of "acceleration trend" as opposed to the currently selected "velocity spectrum," the dynamic GUI 20 may update the data analysis workspaces 46 to perform an acceleration trend analysis on the respective data, as opposed to a velocity spectrum analysis.

After certain components in the measurement data space 54 have been selected, the dynamic GUI 20 may remember the components (i.e., types of data processing or analysis) selected in the measurement data space 54. As such, when another selection in the graphical workspace 42 is received, the dynamic GUI 20 may update the data analysis workspaces 46 according the new selection and may use the same types of data processing or analysis components selected used for the previous selection.

FIG. 6 provides an example view 80 of how the dynamic GUI 20 may update applicable content workspace and the hierarchical view space 52 from the example view 70 of FIG. 5 based on an input received in the graphical workspace 42. Referring briefly to both FIGS. 5 and 6, when the dynamic GUI 20 receives a selection in the graphical workspace 42 that changes the selection 72 of FIG. 5 to a selection 82 of FIG. 6, the dynamic GUI 20 may dynamically update the applicable content workspace accordingly. That is, after the dynamic GUI 20 receives the selection 82 (i.e., sensor 5), the dynamic GUI 20 may identify a pointer associated with the selection 82 and update the data associated with the data workspaces 46 according to the identified pointer. As such, the data being analyzed in the data analysis workspaces 46 may correspond to the selection 82 (i.e., sensor 5 data). For example, referring to the data analysis workspaces 46 of the view 80, each data analysis workspace 46 of the view 80 has been updated from the data analysis workspaces of the view 70. That is, each data analysis workspace 46 of the view 80 that was associated with multiple datasets that corresponded to Machine A (i.e., selection 72) is now depicted in the view 80 as being associated with just one dataset associated with sensor 5 (i.e., selection 82).

Moreover, the dynamic GUI 20 may also update the component highlighted or selected in the hierarchical view space 52 after receiving the selection 82. For example, the dynamic GUI 20 may update the hierarchical view space 52 after the selection 82 has been received to indicate that the sensor 5 of Machine B has been selected. In one embodiment, the dynamic GUI 20 may automatically expand a part of the hierarchical list depicted in the hierarchical view space 52 based on the selection received in the graphical workspace 42, such that the selected component is visible in the hierarchical view space 52.

Figure 7:
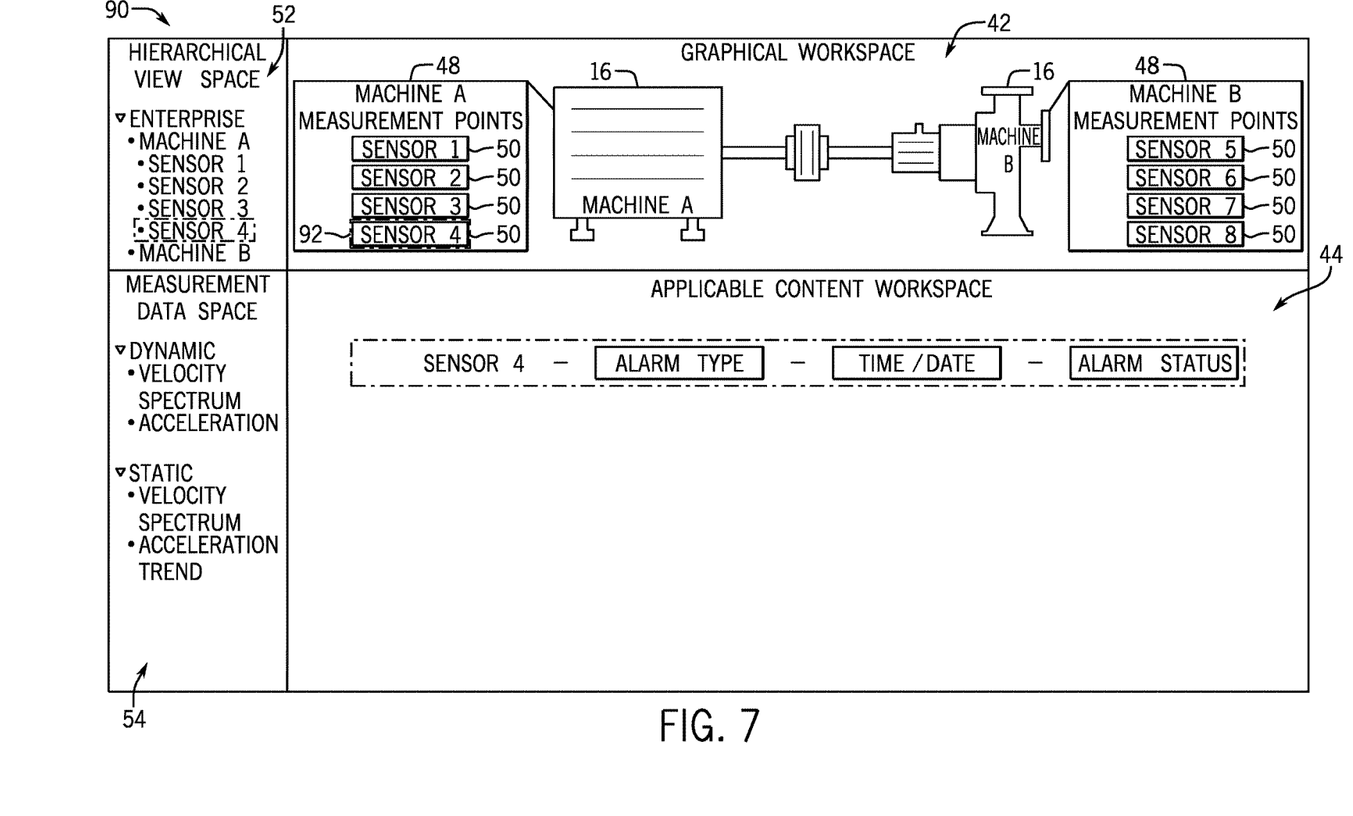
FIG. 7 illustrates a schematic view of the graphics displayed on the graphical user interface having a dynamically linked event information list based on a selection in the graphical user interface of FIG. 3, in accordance with embodiments presented herein.

In addition to providing data processing or analysis in the applicable content workspace, the dynamic GUI 20 may provide event information, status information, or additional information associated with a selection in the graphical workspace 42. For instance, additional information may include reports associated with a selected component, user manuals or datasheets associated with a selected component, or the like. Keeping this in mind, FIG. 7 illustrates an example view 90 of alarm information provided by the dynamic GUI 20 upon receiving a selection 92 in the graphical workspace 42. In one embodiment, after receiving the selection 92, the dynamic graphical workspace 42 may receive a request from the user to display event information such as alarm information associated with the selection 92. In this case, the dynamic GUI 20 may display the event information in the applicable content workspace associated with the sensor 4, as shown in the view 90.

As shown in FIG. 7, the event information related to alarms may include information such a type of alarm that may have been triggered, time and date information related to the triggered alarm, a current alarm status associated with the selection 92, and the like. In FIG. 7, the event information may relate to data received in the data entry 50 that corresponds to sensor 4. As such, the dynamic GUI 20 may retrieve the event information by identifying the pointers associated with the selection 92 and updating the applicable content workspace based on the data that corresponds to the pointers.

After the dynamic GUI 20 displays the event information associated with the selection 92, the dynamic GUI 20 may dynamically update the event information upon receiving a subsequent selection. In this manner, the dynamic GUI 20 may enable users to quickly and easily review the event information that corresponds to various components depicted in the graphical workspace 42.

Figure 8:
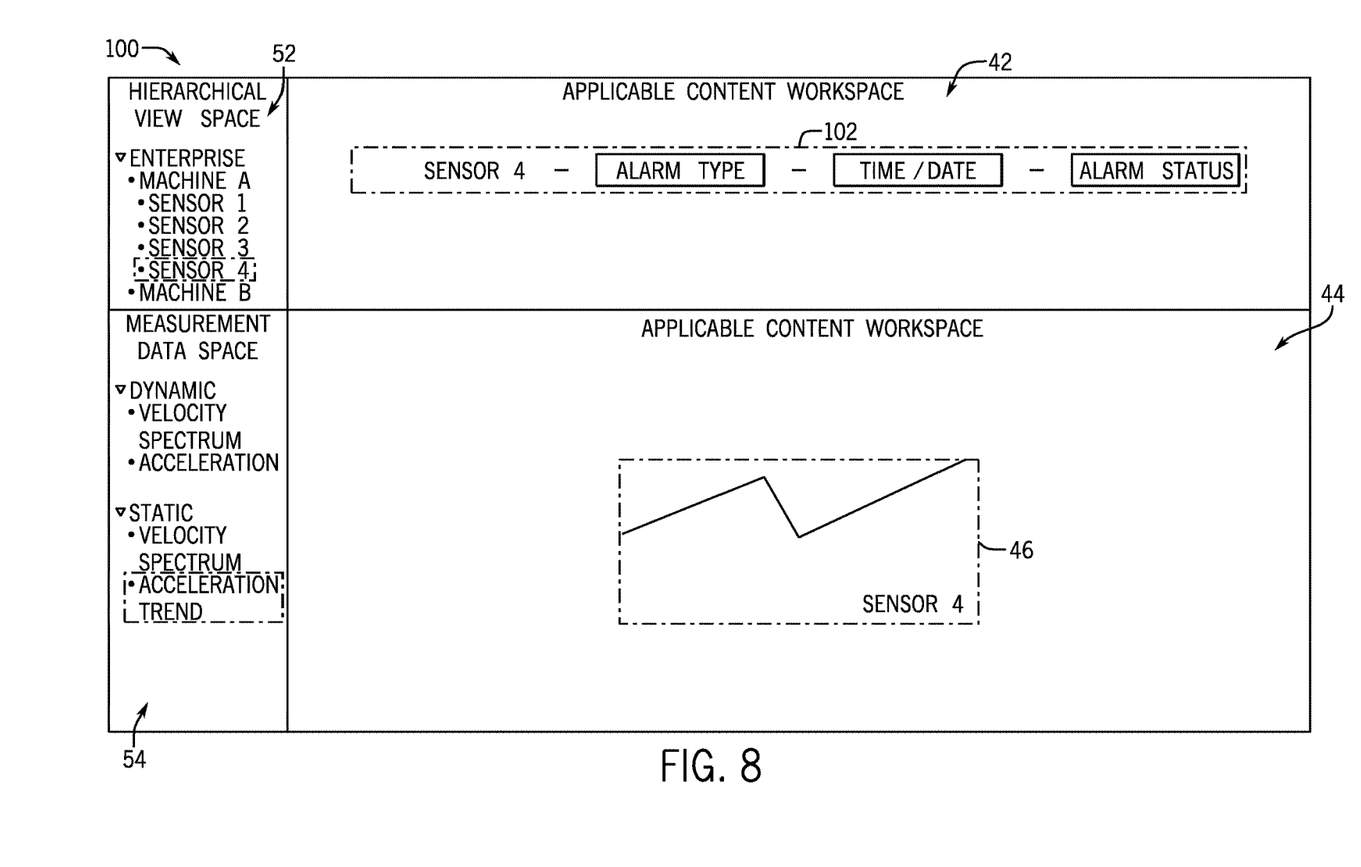
FIG. 8 illustrates a schematic view of the graphics displayed on the graphical user interface, such that the dynamically linked event information list of FIG. 7 is updated based on a selection in the dynamically linked event information list, in accordance with embodiments presented herein.

In certain embodiments, the event information depicted in the applicable content workspace may include components that may be selected by the user. As such, the dynamic GUI 20 may dynamically provide supporting evidence with regard to the event information upon receiving a selection of the event information. FIG. 8, for example, illustrates a view 100 that depicts supporting evidence with regard to an alarm received with respect to sensor 4. In one embodiment, after the dynamic GUI 20 receives a request for supporting evidence with regard to event information depicted in the applicable content workspace, the dynamic GUI 20 may display the event information in the graphical workspace 42 and display the supporting evidence in the applicable content workspace as shown in the view 100. If additional alarms are presented in the event information associated with the sensor 4, the dynamic GUI 20 may dynamically update the supporting evidence presented in the applicable content workspace after receiving a selection of the different alarm. In the same manner, if additional components (e.g., sensors) are depicted in the event information displayed in the graphical workspace 42, the dynamic GUI 20 may dynamically update the supporting evidence presented in the applicable content workspace after receiving a selection of the different component.

Technical effects of the embodiments presented in this disclosure include providing an intuitive and simplistic interactive graphical interface with interactive components that may assist users with monitoring components in various industrial environments. By providing an increased cohesion between visualizations that represent devices currently installed in an industrial environment and data processing or analysis tools for evaluating data associated with the installed devices, users of condition monitoring systems 12 may be trained more quickly to perform various monitoring and maintenance tasks with respect to the devices being monitored. Moreover, by providing an intuitive graphical user interface, the condition monitoring system 12 may be used effectively by a larger group of individuals in the relevant industrial field.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a processor configured to receive one or more datasets associated with one or more components in an industrial environment;
   a graphical user interface (GUI) configured to:
     display one or more visualizations representing the one or more components in a first portion of the GUI, wherein the first portion of the GUI comprises a machine-train diagram comprising the one or more visualizations representing the one or more components;
     receive a first selection of the one or more visualizations;
     display one or more data processing outputs associated with the first selection in a second portion of the GUI, wherein the data processing outputs are determined based on a first dataset that corresponds to a first component associated with the first selection, wherein the first component is represented by a first visualization of the one or more visualizations;
     receive a second selection of the one or more visualizations; and
     dynamically update the data processing outputs displayed on the second portion of the GUI immediately after receiving the second selection, wherein the updated data processing outputs are determined based on a second dataset that corresponds to a second component associated with the second selection, wherein the second component is represented by a second visualization of the one or more visualizations.

2. The system of claim 1, wherein the GUI is configured to update a hierarchical list of the one or more components displayed in a third portion of the GUI based on the second selection.

3. The system of claim 1, wherein the one or more components comprise a machine, a motor, a gas turbine, a heat exchanger, a centrifugal pump, a centrifugal compressor, a fan, a reciprocating compressor, a generator, a steam turbine, a wind turbine, piping, or any combination thereof.

4. The system of claim 1, wherein the one or more components comprise one or more sensors.

5. The system of claim 4, wherein the one or more sensors comprise temperature sensors, current sensors, voltage sensors, pressure sensors, displacement sensors, velocity sensors, acceleration sensors, flow sensors, or any combination thereof.

6. The system of claim 1, wherein the GUI is configured to display a list of one or more measurement data types representing one or more types of data analysis that correspond to the one or more data processing outputs.

7. The system of claim 1, wherein the updated data processing outputs comprise one or more updated plots, wherein the updated plots are generated based on the second dataset.

8. A non-transitory computer-readable medium comprising machine-readable instructions executable by a processor, wherein the machine-readable instructions are configured to cause the processor to:
   display, via a graphical user interface (GUI), a list of one or more measurement data types representing one or more types of data analysis performed on data acquired by one or more sensors associated with a first component of one or more components in an industrial environment, wherein the list of the measurement data types are depicted in a first portion of the GUI;
   receive a first selection of a first measurement type of the one or more measurement data types;
   display one or more data processing outputs associated with the first selection in a second portion of the GUI, wherein the data processing outputs comprise results of the data analysis performed on the data;
   receive a second selection of a second measurement type of the one or more measurement types; and dynamically update the data processing outputs displayed in the second portion of the GUI immediately after receiving the second selection, wherein the data processing outputs previously depicting the results of the data analysis based on the first measurement type are updated such that the results of the data analysis are determined based on the second measurement type.

9. The non-transitory computer-readable medium of claim 8, wherein the machine-readable instructions are configured to cause the processor to display, via the GUI, an event list comprising alarm information that corresponds to a respective component of the one or more components.

10. The non-transitory computer readable-medium of claim 9, wherein the alarm information comprises a type of alarm associated with the respective component, time and date information related to the alarm, a current status of the alarm, or any combination thereof.

11. The non-transitory computer readable-medium of claim 9, wherein the machine-readable instructions are configured to cause the processor to:
receive a request for supporting evidence regarding an item in the event list;
display the supporting evidence;
receive a third selection that corresponds to a second component of the one or more components; and
update the supporting evidence using data regarding the second component.

12. The non-transitory computer readable-medium of claim 8, wherein the one or more measurement types comprise acceleration trend or velocity trend.

13. A method, comprising:
displaying, via a graphical user interface (GUI), one or more data entries representing data acquired by one or more sensors associated with a first component of one or more components depicted in a first portion of the GUI, wherein the first portion of the GUI comprises a machine-train diagram comprising the one or more components;
receiving a first selection of a first data entry of the one or more data entries;
displaying one or more data processing outputs associated with the first selection in a second portion of the GUI, wherein the data processing outputs comprise one or more plots determined based on a first dataset that corresponds to the first data entry;
receiving a second selection of a second data entry of the one or more data entries; and
dynamically updating the data processing outputs displayed in the second portion of the GUI immediately after receiving the second selection, wherein the data processing outputs previously depicting the plots determined based on the first dataset are updated such that the plots are determined based on a second dataset that corresponds to the second data entry.

14. The method of claim 13, wherein the first data entry and the second data entry comprise data acquired from the one or more sensors disposed on the first component and the second component, respectively.

15. The method of claim 13, wherein the one or more sensors comprise temperature sensors, current sensors, voltage sensors, pressure sensors, displacement sensors, velocity sensors, acceleration sensors, flow sensors, or any combination thereof.

16. The method of claim 13, comprising updating a hierarchical list of the components displayed in a third portion of the GUI based on the second selection.

17. The method of claim 13, wherein the updated data processing outputs comprise one or more updated plots, wherein the updated plots are generated based on the second measurement type.

18. The method of claim 13, wherein the data processing outputs comprise a trend plot, a spectrum plot, a historical value plot, a waveform plot, an orbit plot, a bode plot, a compressor performance curve, a pump performance curve, a histogram, a bar graph, a shaft centerline plot, a circular plot, a waterfall plot, or any combination thereof.

19. The method of claim 13, wherein the one or more components comprise a machine, a motor, a gas turbine, a heat exchanger, a centrifugal pump, a centrifugal compressor, a fan, a reciprocating compressor, a generator, a steam turbine, a wind turbine, piping, or any combination thereof.

20. The method of claim 13, wherein the one or more sensors comprise temperature sensors, current sensors, voltage sensors, pressure sensors, displacement sensors, velocity sensors, acceleration sensors, flow sensors, or any combination thereof.

* * * * *